United States Patent Office 2,875,632
Patented Mar. 3, 1959

2,875,632

MECHANICAL MOVEMENT DEVICE

Donald J. O'Rourke, Saginaw, Mich., assignor to General Motors Corporation, Detroit, Mich., a corporation of Delaware Application March 19, 1958, Serial No. 722,565

9 Claims. (Cl. 74—424.8)

This invention relates to mechanical movement devices and more particularly to screw and nut actuators.

The screw and nut actuator of this invention is of the general type including a helically threaded lead screw and a recirculating ball type nut threadedly receiving the lead screw. The nut rotatably supports a housing assembly which is adapted to be secured to a member to be operated so that the housing assembly is non-rotatable. Selectively operable means are provided to brake the nut to a fixed member to thereby stop axial movement of the housing and nut whereby the housing and nut remain stationary upon rotation of the lead screw. Alternately the housing may not be braked to the fixed member so that the housing and nut may move axially along the lead screw upon rotational movement of the lead screw.

Figure 1:
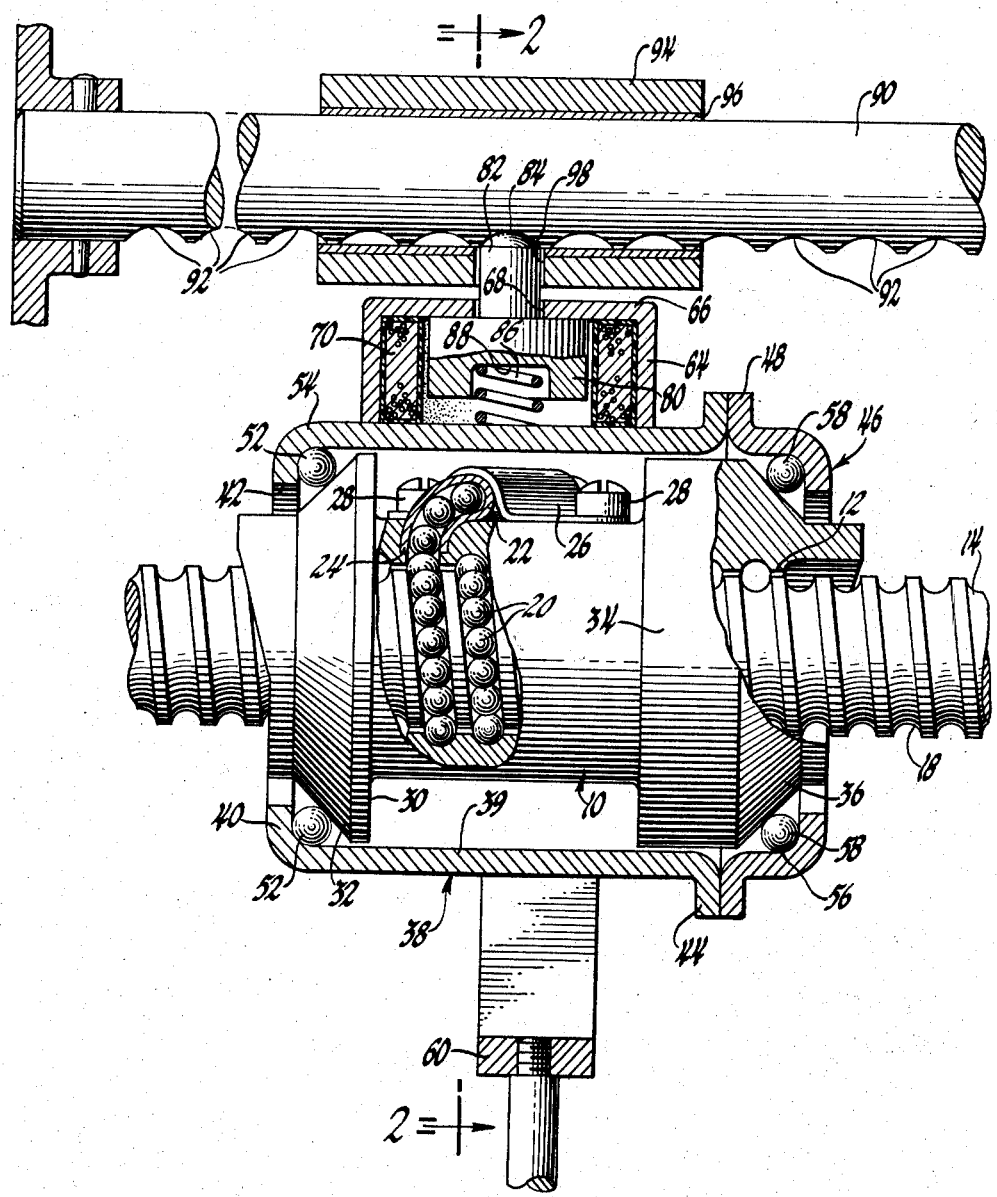
Figure 2:
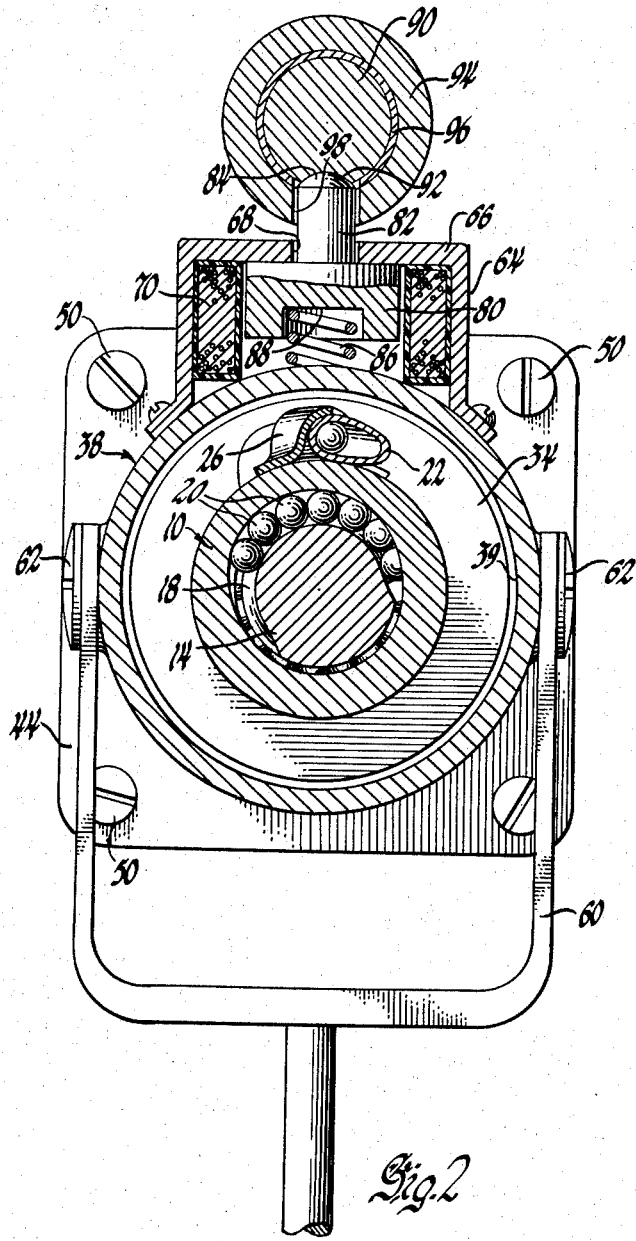

An object of this invention is to provide an improved screw and nut actuator of the type including a helically threaded lead screw and a recirculating ball type nut. Another object of this invention is to provide an improved screw and nut actuator of the type including a helically threaded lead screw and a recirculating ball type nut which rotatably supports a housing assembly wherein the housing assembly may be selectively braked to a fixed member to prevent axial movement of the housing assembly and nut along the lead screw upon rotational movement of the lead screw. A further object of this invention is to provide an improved actuator including a lead screw and a recirculating ball type nut rotatably supporting a non-rotatable housing wherein the housing mounts a selectively operable braking member which may be engaged and disengaged with a fixed member to either prevent the nut and housing from moving axially along the lead screw upon rotational movement thereof or to allow the nut and housing to move axially along the lead screw upon rotational movement thereof. These and other objects of this invention will be readily apparent from the following specification and drawings, wherein:

Figure 1 is a partial axial sectional view of a screw and nut actuator according to this invention, with parts thereof broken away; and Figure 2 is a sectional view taken along the plane indicated by line 2—2 of Figure 1.

Referring now particularly to Figure 1 of the drawings, an annular nut 10 includes a helically threaded bore 12 which receives a helically threaded lead screw 14 which is fixed against axial movement and rotated by a suitable actuator, such as an electric motor, not shown. The helical groove of bore 12 and the helical groove 18 of the lead screw are of the same pitch and define a helical passage. A plurality of ball bearings 20 fit within this helical passage and ride in the helical grooves of the nut and the lead screw, with opposite ends of the passage being interconnected by a transfer tube 22, the ends 24 of which extend tangentially to the helical passage. A bracket 26 bolted to the nut at 28 secures the tube 22 in place. This arrangement of a recirculating ball type nut and lead screw operates in a manner whereby the balls recirculate through the helical passage and the transfer tube 22 whenever the nut and lead screw rotate relative to each other, but do not recirculate whenever the nut and lead screw rotate with each other.

The nut 10 further includes a radially outwardly extending flange 30 at one end thereof provided with a frusto-conical surface 32. Preferably the flange 30 is formed integral with the body of nut 10. A flange 34 adjacent the other end of the nut also includes a frusto-conical surface 36 which is generally complementary to the surface 32 of the flange 30, although facing in an opposite direction with respect thereto. An annular housing 38 surrounds the nut 10, and includes a cap 39 having one end thereof terminating in a radially inwardly extending flange 40 defining a circular opening 42 and the other end thereof terminating in a radially outwardly extending square-shaped flange 44. A cap 46 includes a radially outwardly extending square-shaped flange 48 which fits against flange 44 of cap 39 and is secured thereto in a suitable manner as by bolts 50, Figure 2. An annular row of ball bearings 52 seats between the annular shoulder 54 of housing 38 and the frusto conical surface 32 of flange 30 to rotatably mount one end of the housing 38 on nut 10 and provide a thrust bearing for transferring axial thrust loads to the left between the nut and the housing. A similar annular row of ball bearings 58 fit between the annular shoulder 56 of housing 38 and the frusto-conical surface 36 of flange 34 to rotatably mount the other end of the housing 38 on nut 10 and provide a thrust bearing for transferring axial thrust loads to the right between the nut 10 and the housing 38. A yoke 60 is bolted at 62 to opposite sides of the housing 38, as best shown in Figure 2 of the drawings. Although not shown in the drawings, the yoke is adapted to be connected to a member to be operated whereby the housing 38 is non-rotatable.

A generally square-shaped housing 64 is welded or otherwise secured to the housing 38 and provided with an upper wall 66 having a circular opening 68 therein. A solenoid coil 70 is fixedly secured within the housing 64 and the armature 80 of the solenoid includes an annular extension 82 provided with a spherically shaped end 84. A coil compression spring 86 seats on the housing 38 and also within a bore 88 of the solenoid armature to bias the solenoid armature outwardly of the coil within opening 68 to an outer limit position wherein the armature engages the upper wall 66 of housing 64 adjacent the opening 68 therein. A rod 90 is fixedly mounted on a suitable support at each end thereof and is provided with an axially spaced series of spherically shaped depressions 92 complementary to the end 84 of extension 82. A sleeve 94 is slidably mounted on the rod by a bushing 96, with the sleeve and bushing being secured together in a suitable manner and being provided with aligned circular openings 98 which slidably receive the extension 82 of the solenoid armature.

The operation of the armature will now be described. When the solenoid coil 70 is not energized, as shown in the drawings, the end 84 of extension 82 of the armature fits within one of the depressions 92 in rod 90 so that the housing 38 is held against axial movement within predetermined axial thrust limits. Thus, if the lead screw 14 is rotated, the nut 10 will rotate with the lead screw as the ball bearings 20 do not recirculate, although the nut will try and move axially along the lead screw. The axial thrust of the nut 10 will be transferred to the housing 38 by either the bearings 52 or 58, depending on the direction of rotation of the lead screw, and the housing 38 in turn will transfer this thrust to the rod 90 through engagement of the end 84 of the solenoid armature with one of the depressions 92 of the rod. Thus, although the lead screw will rotate, the nut 10 will rotate therewith under normal thrust conditions and the ball bearings 20 will not recirculate within the helical passage defined by the nut and lead screw and the transfer tube 22. However, should the axial thrust load transferred from the nut 10 to the housing 38 become greater than the frictional engagement force between the end 84 of the solenoid armature and the depression 92 under the action of spring 86, this axial thrust will then move the housing 38 axially to came the solenoid armature out of engagement with the particular groove 92 and in engagement with the next successive groove 92, etc.

Assuming now that the solenoid coil 70 is energized to retract the solenoid armature 80 inwardly within the coil against the action of spring 86. The extension 82 of the solenoid armature will thus be moved inwardly within the housing 64 to move the end 84 of the extension out of engagement with the particular depression 92 in rod 90, although the extension 82 will not be retracted out of the openings 98 in the sleeve 94 and bushing 96. If the lead screw 14 is now rotated, the ball bearings 20 will move within the helical passage defined by the nut and lead screw and transfer tube 22 whereby the nut 10 will move axially along the lead screw and in turn move the housing 38 axially along the lead screw as either the ball bearings 52 or 58 transfer axial thrust loads from the nut to the housing 38. As the nut and housing move axially along the lead screw, the engagement of the extension 82 with the sleeve 94 will move the sleeve axially along the rod 90. Since the friction between the ball bearings 52 and 58 and the shoulders 54 and 56 and surfaces 32 and 30 is greater than the friction between the ball bearings 20 and the groove 18 of the lead screw 14, the nut 10 will not rotate within the housing 38 when the solenoid armature 80 is retracted and the lead screw 14 is rotated so as to move the housing and nut axially of the lead screw. This differential friction prevents nut 10 from rotating when the solenoid armature 80 is retracted and the lead screw rotated. When the solenoid coil 70 is deenergized, the armature 82 of the solenoid will be moved outwardly by the spring 86 to move the end 84 of the armature into engagement with one of the depressions 92 of the rod 90.

By providing the spherically shaped end 84 on the solenoid armature and the complementary shaped depression 92 in the fixed rod 90, the housing 38 will normally be held against axial movement under predetermined axial thrust loads. However, if the thrust loads become sufficient, the solenoid armature will be cammed inwardly of the housing 64, as previously explained, due to the arcuate sliding engagement between the end 84 and the depression 92.

Thus, this invention provides a new and improved screw and nut actuator of the recirculating ball type.

What is claimed is:

1. A mechanical movement device comprising, first and second rotatable members, means interconnecting said members for axial movement of one of said members along the other of said members upon relative rotational movement therebetween, a non-rotatable member, means rotatably mounting said one of said members on said non-rotatable member, the friction between said first and second rotatable members being less than the friction between said one of said rotatable members and said non-rotatable member, a fixed member including means defining a plurality of predetermined axial positions of said one of said members relative to said other of said members, and means on said non-rotatable member for selective engagement with said means on said fixed member to hold said one of said members in one of said axial positions against axial movement along the other of said members upon rotational movement of said other of said members, the differential friction causing said one of said members to rotate with said other of said members relative to said non-rotatable member.

2. A mechanical movement device comprising, first and second rotatable members, means interconnecting said members for axial movement of one of said members along the other of said members upon relative rotational movement therebetween, a non-rotatable member, means rotatably mounting said one of said members on said non-rotatable member and transmitting axial thrust loads thereto, the friction between said first and second rotatable members being less than the friction between said one of said rotatable members and said non-rotatable member, a fixed member including means defining a plurality of predetermined axial positions of said one of said members relative to said other of said members, and means on said non-rotatable member for selective engagement with said means on said fixed member to hold said one of said members in one of said axial positions against axial movement within predetermined axial thrust loads upon rotational movement of said other of said members, the differential friction causing said one of said members to rotate with said other of said members relative to said non-rotatable member within said predetermined axial thrust loads.

3. A mechanical movement device comprising, first and second rotatable members, means interconnecting said members for axial movement of one of said members along the other of said members upon relative rotational movement therebetween, a non-rotatable member, means rotatably mounting said one of said members on said non-rotatable member, a fixed member including means defining a plurality of predetermined axial positions of said one of said members relative to said other of said members, means on said non-rotatable member for selective engagement with said means on said fixed member to hold said one of said members in one of said axial positions against axial movement along the other of said members upon rotational movement of said other of said members, and means for selectively releasing said means on said non-rotatable member from engagement with said means on said fixed member to allow axial movement of said one of said members along said other of said members upon relative rotational movement therebetween, the friction between said first and second rotatable members being less than the friction between said one of said rotatable members and said non-rotatable member whereby said one of said members will rotate with said other of said members relative to said non-rotatable member upon engagement of said means on said non-rotatable member with said means on said fixed member, and said one of said members will be held against rotation with respect to said non-rotatable member upon disengagement of said means on said non-rotatable member from said means on said fixed member.

4. A mechanical movement device comprising, first and second rotatable members, means interconnecting said members for axial movement of one of said members relative to the other of said members upon relative rotational movement therebetween, a non-rotatable member, thrust bearing means rotatably mounting said one of said members on said non-rotatable member, the friction between said first and second rotatable members being less than the friction between said one of said rotatable members and said non-rotatable member, a fixed member including means defining a plurality of predetermined axial positions of said one of said members relative to said other of said members, and means on said non-rotatable member for selective engagement with said means on said fixed member to hold said one of said members in one of said axial positions against axial thrust loads transmitted from said one of said members to said non-rotatable member by said thrust bearing means upon rotational movement of said other of said members, the differential friction causing said one of said members to rotate with said other of said members relative to said non-rotatable member.

5. A mechanical movement device comprising, a lead screw, a nut threadedly mounted on said lead screw for axial movement therealong upon relative rotational movement therebetween, a non-rotatable member, means rotatably mounting said nut on said non-rotatable member, the friction between said nut and lead screw being less than the friction between said nut and said non-rotatable member, a fixed member including means defining a plurality of predetermined axial positions of said nut relative to said lead screw, and means on said non-rotatable member for selective engagement with said means on said fixed member to hold said nut in one of said axial positions against axial movement along said lead screw upon rotational movement of said lead screw, the differential friction causing said nut to rotate with said lead screw relative to said non-rotatable member.

6. A mechanical movement device comprising, a lead screw, a nut threadedly mounted on said lead screw for axial movement therealong upon relative rotational movement therebetween, a non-rotatable member, bearing means rotatably mounting said nut on said non-rotatable member, the friction between said nut and lead screw being less than the friction between said nut and said non-rotatable member, a fixed member including a plurality of depressions defining a plurality of predetermined axial positions of said nut relative to said lead screw, and a resiliently biased member on said non-rotatable member for selective engagement with any one of said depressions on said fixed member to hold said nut in one of said axial positions thereof against axial thrust loads upon rotational movement of said lead screw, the differential friction causing said nut to rotate with said lead screw relative to said non-rotatable member.

7. A mechanical movement device comprising, a lead screw, a nut threadedly mounted on said lead screw for axial movement therealong upon relative rotational movement therebetween, a non-rotatable member, thrust bearing means rotatably mounting said nut on said non-rotatable member, the friction between said nut and lead screw being less than the friction between said nut and said non-rotatable member, a fixed member including a plurality of means defining a plurality of predetermined axial positions of said nut relative to said lead screw, and means on said non-rotatable member for selective engagement with any one of said means on said fixed member to hold said nut in one of said axial positions thereof against axial thrust loads applied to said non-rotatable member by said thrust bearing means upon rotational movement of said lead screw, the differential friction causing said nut to rotate with said lead screw relative to said non-rotatable member.

8. A mechanical movement device comprising, a lead screw, a recirculating ball type nut threadedly mounted on said lead screw for axial movement therealong upon relative rotational movement therebetween, a non-rotatable nut, axial thrust bearings rotatably mounting said housing on said housing, the friction between said nut and said lead screw being less than the friction between said nut and said non-rotatable housing, a fixed member including a plurality of axially spaced depressions defining a plurality of predetermined axial positions of said nut relative to said lead screw, a resiliently biased plunger mounted on said housing for selective engagement with any one of said depressions on said fixed member to hold said nut in any one of said axial positions thereof against axial thrust loads applied to said housing by said nut upon rotational movement of said lead screw, the differential friction causing said nut to rotate with said lead screw relative to said housing, and means for selectively releasing said plunger from engagement with said any one of said depressions.

9. A mechanical movement device comprising, a lead screw, a nut threadedly mounted on said lead screw for axial movement therealong upon relative rotational movement therebetween, a non-rotatable housing, bearing means rotatably mounting said nut on said housing, the friction between said nut and lead screw being less than the friction between said nut and said housing, a fixed member, and selectively operable means on said housing engageable with said fixed member to thereby hold said housing against axial movement along said lead screw, the differential friction causing said nut to rotate with said lead screw relative to said housing upon engagement of said operable means with said fixed member, and causing said nut to be held against rotation with respect to said housing for axial movement of said nut and housing along said lead screw upon disengagement of said operable means from said fixed member.

References Cited in the file of this patent

UNITED STATES PATENTS

| | | |
|---|---|---|
| 1,276,811 | Ragan | Aug. 27, 1918 |
| 2,504,018 | Gibson et al. | Apr. 11, 1950 |
| 2,701,478 | Riess | Feb. 8, 1955 |
| 2,716,352 | Wilson | Aug. 30, 1955 |